(12) United States Patent
Blair et al.

(10) Patent No.: US 7,791,744 B2
(45) Date of Patent: Sep. 7, 2010

(54) APPARATUS FOR AND METHOD OF PRINT RESUMING FOLLOWING A PRINT INTERRUPTION EVENT

(75) Inventors: Brian E. Blair, Raleigh, NC (US); James D. Piette, Winooski, VT (US); Robert D. Yoder, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1043 days.

(21) Appl. No.: 11/468,024

(22) Filed: Aug. 29, 2006

(65) Prior Publication Data

US 2008/0055628 A1 Mar. 6, 2008

(51) Int. Cl.
*G06K 15/00* (2006.01)
(52) U.S. Cl. ..................... 358/1.12; 358/1.18
(58) Field of Classification Search ............ 358/408, 358/474, 400, 471, 500, 504, 413, 422, 437, 358/1.12, 1.18; 379/100.01; 355/26, 84; 399/95, 96, 130, 87; 271/256
See application file for complete search history.

(56) References Cited

U.S. PATENT DOCUMENTS

| 5,018,081 | A | 5/1991 | Yamaguchi et al. |
| 5,148,284 | A | 9/1992 | Nishikawa et al. |
| 5,206,735 | A | 4/1993 | Gauronski et al. |
| 5,282,050 | A * | 1/1994 | Ishizuka et al. ............. 358/400 |
| 5,684,934 | A | 11/1997 | Chen et al. |
| 5,745,662 | A | 4/1998 | Nagata et al. |
| 5,760,927 | A | 6/1998 | Sakai et al. |
| 6,450,610 | B1 | 9/2002 | Shimura |
| 2002/0145747 | A1* | 10/2002 | Burquist et al. ............ 358/1.14 |
| 2002/0149790 | A1* | 10/2002 | Furuichi .................... 358/1.15 |
| 2003/0007177 | A1* | 1/2003 | Ferlitsch .................... 358/1.15 |
| 2006/0132845 | A1* | 6/2006 | Itaki et al. .................. 358/1.15 |
| 2006/0215218 | A1* | 9/2006 | Ujigawa .................... 358/1.15 |
| 2007/0296932 | A1* | 12/2007 | Suzuki ........................ 355/18 |

FOREIGN PATENT DOCUMENTS

| JP | 06306464 | 6/1996 |
| JP | 02005274942 | * 10/2009 |

* cited by examiner

*Primary Examiner*—Jerome Grant, II
(74) *Attorney, Agent, or Firm*—Cynthia Seal; Hoffman Warnick LLC

(57) ABSTRACT

The invention is directed to resuming printing on a printer following a print interruption event. An apparatus in accordance with an embodiment of the present invention includes: a scanner configurable to communicate with a printer and a printing application, wherein the scanner is configured to scan a printing at the printer upon receipt of a printing error. A method in accordance with an embodiment of the present invention includes: receiving a printing error when printing a document; scanning the actual printing of the document at a printer; and notifying an application of results of the scanning.

1 Claim, 1 Drawing Sheet

APPARATUS FOR AND METHOD OF PRINT RESUMING FOLLOWING A PRINT INTERRUPTION EVENT

BACKGROUND OF THE INVENTION

1. Field of the Invention

The present invention generally relates to printers. More specifically, the present invention is directed to an apparatus for resuming printing on a printer following a print interruption event and a method of resuming printing.

2. Related Art

Current printer and printer technologies offer no direct feedback when an error event in printing has occurred. That is, various indirect events (e.g., out of paper, transport head movement error, etc.) may trigger an error at the printer. Similarly, events such as a paper jam or electrical failure may signal an error. When recovering from any printer error, be it indirect, direct, or otherwise, it is important for printing accuracy purposes that the printer and/or the printing software application receive information that indicates exactly what has been de facto printed at the printer up to the error occurrence. Currently, the printer is not offered this exact information and therefore must resort to alternative solutions such as waiting for successful printing of every line in the document and/or reprinting data. This is time consuming, inaccurate, and/or confusing to the reader of the document because printing may be omitted and/or double printed. In particular with point of sale (POS) printing, this is unacceptable. For example, a sales receipt produced in a POS printing environment that had an aforementioned print interruption event, will often incorrectly list an item(s) for sale due to printing redundancy (e.g., printing the sales item twice, etc.). Accordingly, a need exists for an improvement in the art of printers that more accurately recovers printing after a printer event.

SUMMARY OF THE INVENTION

The present invention is directed to a resuming printing on a printer following a print interruption event.

A first aspect of the present invention is directed to an apparatus, comprising: a scanner configurable to communicate with a printer and a printing application, wherein the scanner is configured to scan a printing at the printer upon receipt of a printing error.

A second aspect of the present invention is directed to a method for print resuming, comprising: receiving a printing error when printing a document; scanning the document at a printer; and notifying an application of results of the scanning.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 2:
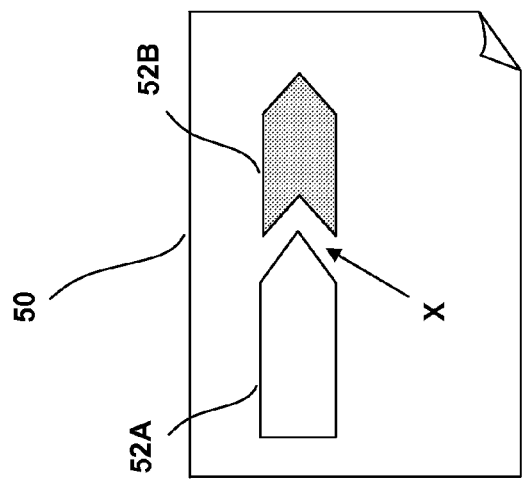
FIG. 2 depicts a schematic representation of a document having had the method of print resuming applied thereto in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to both an apparatus for, and a method of, resuming printing on a printer following a print interruption event.

Figure 1:
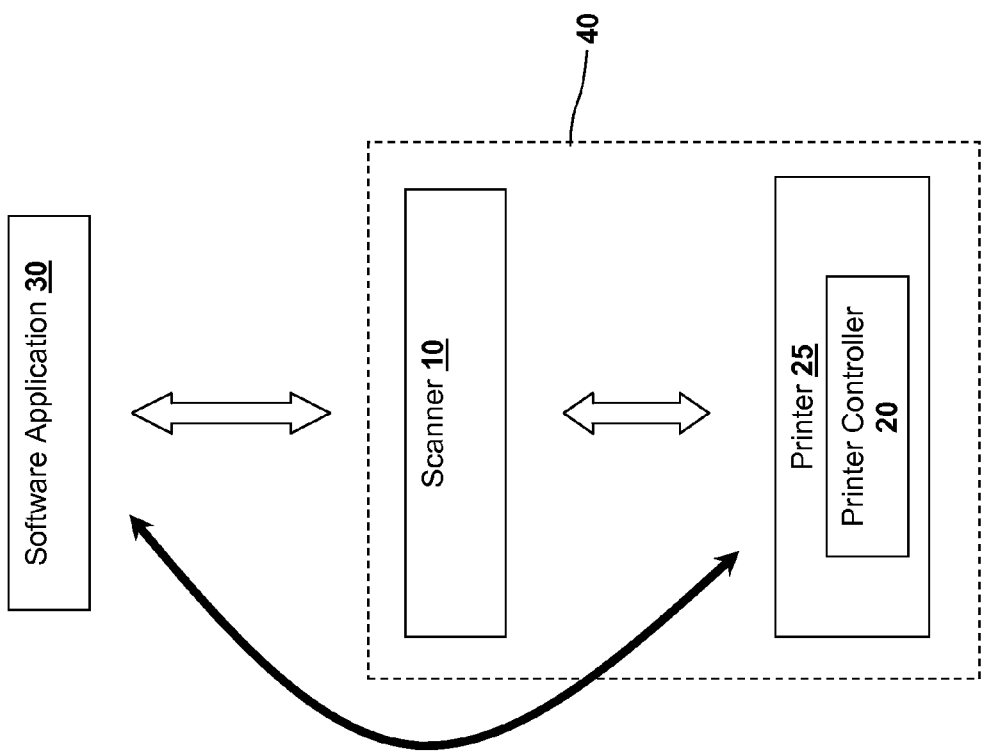
FIG. 1 depicts an environment employing an apparatus for and a method of print resuming in accordance with an embodiment of the present invention.

An illustrative print resuming environment in accordance with an embodiment of the present invention is depicted in FIG. 1. The environment includes an apparatus (e.g., scanner) 10, a printer 25 having a printer controller 20, and at least one software application 30. The scanner 10, printer 25 and printer controller 20 may comprise collectively an improved printer system 40. The scanner 10 may be any suitable image scanner with known or later developed technologies. The scanner 10 may be, for example, model part no. IA2004-CE10A, manufactured by Rohm Co. Ltd. of Kyoto, Japan. The software application(s) 30, scanner 10, and printer controller 20 may be in communication with each other, as denoted by the double-ended arrows in FIG. 1. Software application 30 is able to communicate with the printer controller 20 so that printer 25 prints a document 50, derived from one, or more, files created by software application 30, as is known in the art.

In accordance with the present invention, a document 50 is produced by the printer 25. In one use of the aforementioned type of system is with retail store solutions (RSS), or point of sale (POS) printers. Typically, the document 50 created in RSS or POS environments is a sale receipt. Clearly, the document 50 may be any physical printing of text, graphics, and/or a combination of both on paper or other suitable medium, derived from one, or more, software applications 30. Specifically, a first printing 52A is printed by the printer 25 on the document 50. Upon a detection of any print interruption event, the printer controller 20 is notified and the first printing 52A is either stopped by the printer controller 20 and/or the first printing 52A is stopped for other reasons (e.g., loss of power, etc.), as denoted by an "X". In any event, the software application 30 may request from the printer controller 20 notification as to what is contained in the first printing 52A. The scanner 10 is directed to scan the first printing 52A of the document 50. The scanner 10 scans the document 50 and the first printing 52A, thereby determines exactly what has been printed successfully on document 50 (e.g., first printing 52A) from software application 30. Software application 30 notifies printer controller 20 to resume printing on document 50 with a second printing 52B. Based on the scanning of first printing 52A, the second printing 52B, after X, resumes printing exactly after where the first printing 52A stopped on the document 50. In this manner, there is neither any unnecessary reprinting (i.e., redundancy) on the document 50, nor any omission of printing on the document 50.

The print interruption event may be caused by a single error, multiple errors, and/or some combination of errors. Errors may include, for example, a paper jam, an electrical failure, a transport head movement error, out of paper, a home error, cover open, reset, and the like.

The foregoing description of the embodiments of this invention has been presented for purposes of illustration and description. It is not intended to be exhaustive or to limit the invention to the precise form disclosed, and many modifications and variations are possible.

What is claimed is:

1. A method for print resuming, comprising:

receiving a printing error when printing a document on a printer;

scanning the document at a scanner to determine a first printing portion printed on the document prior to the printing error and a second printing portion remaining to be printed on the document;

notifying an application of results of the scanning; and resuming printing the document by printing the second printing portion on the document.

* * * * *